UNITED STATES PATENT OFFICE.

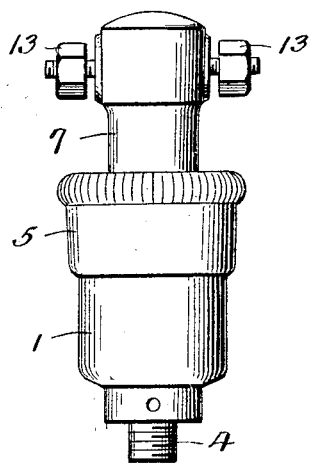
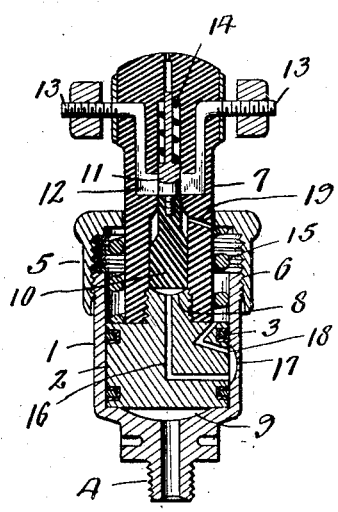
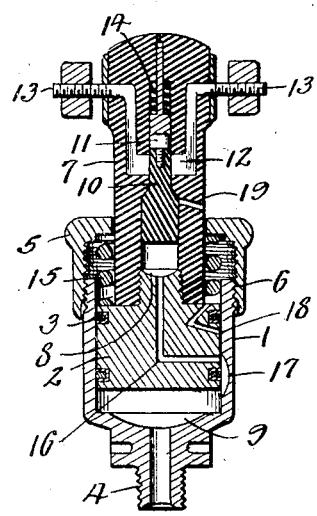

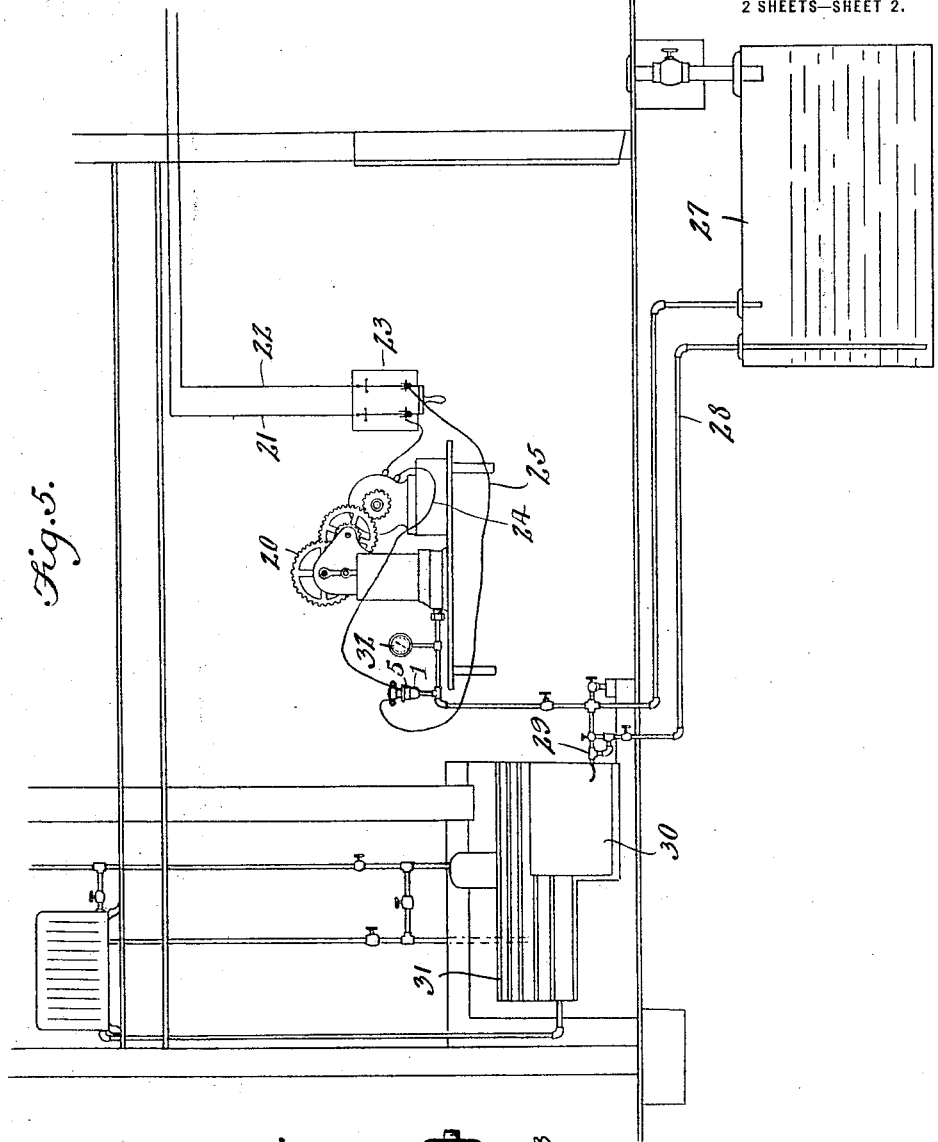

JOSEPH A. HERRON, OF LOS ANGELES, CALIFORNIA.

PUMP-REGULATOR.

1,199,551.      Specification of Letters Patent.      Patented Sept. 26, 1916.

Application filed November 6, 1915. Serial No. 60,094.

*To all whom it may concern:*

Be it known that I, JOSEPH A. HERRON, a citizen of the United States, residing at Los Angeles, in the county of Los Angeles and State of California, have invented new and useful Improvements in Pump-Regulators, of which the following is a specification.

This invention relates to pressure regulators for air compressors, the object in view being to provide an automatic pressure regulating device for use in connection with air compressors which are electrically operated or driven, the pressure regulator being in the form of a circuit breaker and closer operating automatically under a predetermined air pressure to open the circuit which operates the motor driving the air compressor and thereby throw the latter out of operation, the device also operating automatically when the pressure falls below a predetermined point to again close the circuit and again start the motor in operation.

The idea of the invention is to provide an automatic control for air compressors whereby a certain definite and predetermined uniform pressure may be maintained at all times for the purpose of raising liquids from storage tanks or reservoirs and forcing the same through the same through pipe lines or the like to burners and other devices as, for example, raising fuel oil from a low level to a higher level or for the purpose of measuring the liquid by means of a meter in the transference of fuel oil from one container to another, the flow of oil being constant so that it may be accurately measured.

The device is especially useful in supplying a given amount of oil or other liquid fuel to the burning point under the least possible variation of pressure, thereby causing to be maintained a constant and unvarying degree of heat for the purpose, for example, of furnishing a constant and uniform supply of steam, hot water or hot air.

A further object of the invention is to provide means whereby the device may be adjusted to different pressures, higher or lower, as may be required in accordance with existing conditions, the device thereafter acting positively and efficiently to maintain the predetermined pressure.

With the above and other objects in view, the invention consists in the novel construction, combination and arrangement of parts, as herein described, illustrated and claimed.

In the accompanying drawings:—Figure 1 is a side elevation of a pressure regulator embodying the present invention. Fig. 2 is a top plan view of the same. Fig. 3 is a longitudinal section through the pressure regulator showing the piston and plunger at the inner ends of their throw. Fig. 4 is a similar view showing the position of the piston and plunger when acted upon by excess pressure for breaking the circuit. Fig. 5 is a diagrammatic view showing the manner in which the pressure regulator may be used.

The pressure regulator contemplated in this invention comprises a compressed air cylinder 1 in which is arranged a reciprocatory piston 2 shown as provided with the usual piston rings 3. One end of the cylinder is formed with a compressed air inlet 4 and the other end is closed by means of a cap 5 which is threaded thereon as shown at 6, the cap 5 serving as a closure for one end of the cylinder and also as an adjustable tensioning device, the purpose of which will hereinafter appear.

The piston 2 carries a head piece 7 which is bored to provide a second expansion chamber 8, the cylinder 1 having the inner end portion thereof recessed as shown to form the primary expansion chamber 9 into which the compressed air is admitted to move the piston 2 longitudinally of and within the cylinder 1. Within the secondary expansion chamber 8 is mounted a piston shaped plunger 10 which is movable back and forth therein and which carries a contact bridge piece 11 which normally lies between the inwardly facing terminals or contacts 12 of a pair of binding posts 13 to which the current wires are connected, the current passing through one binding post 13 and through the bridge piece 11 to the other binding post 13 thereby forming a circuit which operates the electrically driven air compressor hereinafter referred to.

The head piece 7 is formed of insulating material such as hard rubber or the like and the plunger 10 is also formed of insulating material so that when the plunger 10 is moved upwardly in Fig. 3 the bridge piece 11 will pass out of contact with the terminals 12 thereby breaking the circuit and stopping the air compressor. A coiled expansion spring 14 is housed within the head piece 7 and serves to quickly return the plunger and bridge piece to circuit closing position when the air pressure falls to a predetermined point. Interposed between the piston 2 and the cap 5 is an expansion spring 15 the tension of which may be adjusted by turning the cap 5 on its threaded connection with the cylinder 1. This enables any desired degree of resistance to be imparted to the movement of the piston 2 under the action of the compressed air against the under side thereof.

The piston 2 is provided with a main compressed air passage 16 substantially L-shaped as shown in Figs. 3 and 4, one end of said passage opening out at the periphery of the piston while the other end thereof opens into the expansion chamber 8. The cylinder is provided in the inside wall thereof with a by-pass 17 so that when the piston 2 is moved in the direction of the cap 5, the compressed air in the primary expansion chamber 9 will enter the by-pass 17 and be conducted to the secondary expansion chamber 8 by means of the passage 16. This results in moving the plunger 10 longitudinally and shifting the bridge piece 11 out of engagement with the terminals or contacts 12 thereby breaking the circuit.

The piston is further provided with a relief passage 18 which is connected with the passage 16 by means of the by-pass 17 when the piston returns to its normal position as shown in Fig. 3. This permits the compressed air in the chamber 8 to escape through the passage 16 to the by-pass 17 and the relief passage 18 into the space above the piston and within the cap 5 from which it readily escapes through the central opening therein through which the head piece 7 slides.

19 designates a vent leading from the expansion chamber 8 into the space above the piston 2 and within the cap 5 so as to prevent the formation of an air cushion above the plunger 10 when the latter is moved outwardly in the manner hereinabove described.

Fig. 5 illustrates the manner in which the pressure regulator may be used, 20 designating an air compressor embodying an electric motor to which the lead wires 21 and 22 are connected through an interposed manually controlled switch 23. One of the lead wires is formed in two sections 24 and 25 which lead to the binding posts 13 of the pressure regulator hereinabove described. The air from the compressor 20 is shown as led through a pipe 26 to a storage tank or reservoir 27, the fuel being forced therefrom through a feed pipe 28 to the burner 29 of the fire box 30 of a boiler 31 shown as forming a part of the hot water or steam heating system of a house.

32 designates an air pressure gage to assist the operator in adjusting the pressure regulator above described.

From the foregoing description, taken in connection with the accompanying drawings, the operation of the pressure regulator will now be understood.

When the switch 23 is closed, the current is fed to the electric motor of the air compressor thereby starting the latter in operation. When the pressure rises to a predetermined point, the piston 2 is moved so as to uncover the by-pass 17. Thereupon, the compressed air from the expansion chamber 9 enters the by-pass 17 and the passage 16 and upon reaching the secondary expansion chamber 8, pushes the plunger 10 outwardly, thereby moving the bridge piece 11 out of engagement with the contacts 12. This breaks the circuit and therefore results in the stoppage of the air compressor. When the pressure falls to the normal point, the piston 2 returns to its normal position at which point the by-pass 17 bridges and connects the passages 16 and 18, permitting the compressed air behind the plunger 8 to escape through the passage 16, by-pass 17 and passage 18 to the space above the piston 2 and within the cap 5 and thence to the atmosphere. As this takes place, the spring 14 acts to quickly return the plunger and also move the bridge piece 11 to its circuit closing position, whereupon the air compressor again starts its operation.

By the means above described a certain constant predetermined pressure is maintained for the purpose above referred to and for various other purposes, such as will readily suggest themselves to the manufacturer. The pressure regulator is entirely automatic in its operation and is also reliable in use as there is no delicate mechanism to get out of order. There is also an entire absence of valves, the air passages being closed and opened by the movement of the piston in its cylinder. Furthermore, the pressure regulator may be manufactured at small cost and economically maintained in perfect working condition.

Having thus described my invention, I claim:—

1. A pressure regulator for electrically operated air compressors embodying in combination, a compressed air cylinder, a piston working in said cylinder, an electric circuit breaker actuated and controlled by said piston and operating to break the circuit when the air pressure reaches a predetermined maximum, said circuit breaker embodying a head piece, circuit terminal contacts carried thereby, a plunger operated by air pressure and movable in said head piece, and a circuit closing bridge piece actuated by said plunger and adapted to be moved thereby out of contact with said contacts.

2. A pressure regulator for electrically operated air compressors embodying in combination, a compressed air cylinder, a piston working in said cylinder, an electric circuit breaker actuated and controlled by said piston and operating to break the circuit when the air pressure reaches a predetermined maximum, said circuit breaker embodying a head piece, circuit terminal contacts carried thereby, a plunger operated by air pressure and movable in said head piece, and a circuit closing bridge piece actuated by said plunger and adapted to be moved thereby out of contact with said contacts, said piston being formed with a compressed air passage leading to the chamber in which said plunger works so that excess pressure acts first on the piston and then on the plunger.

3. A pressure regulator for electrically operated air compressors embodying in combination, a compressed air cylinder, a piston working in said cylinder, an electric circuit breaker actuated and controlled by said piston and operating to break the circuit when the air pressure reaches a predetermined maximum, said circuit breaker embodying a head piece, circuit terminal contacts carried thereby, a plunger operated by air pressure and movable in said head piece, and a circuit closing bridge piece actuated by said plunger, and adapted to be moved thereby out of contact with said contacts, said piston being formed with a compressed air passage leading to the chamber in which said plunger works so that excess pressure acts first on the piston and then on the plunger, the piston being also formed with a pressure relief passage.

4. A pressure regulator for electrically operated air compressors embodying in combination, a compressed air cylinder, a piston working in said cylinder, an electric circuit breaker actuated and controlled by said piston and operating to break the circuit when the air pressure reaches a predetermined maximum, said circuit breaker embodying a head piece, circuit terminal contacts carried thereby, a plunger operated by air pressure and movable in said head piece, and a circuit closing bridge piece actuated by said plunger and adapted to be moved thereby out of contact with said contacts, said piston being formed with a compressed air passage leading to the chamber in which said plunger works so that excess pressure acts first on the piston and then on the plunger, the cylinder being formed with a by-pass with which the compressed air passage of the piston communicates when the latter is moved by excess pressure.

5. A pressure regulator for electrically operated air compressors embodying in combination, a compressed air cylinder, a piston working in said cylinder, an electric circuit breaker actuated and controlled by said piston and operating to break the circuit when the air pressure reaches a predetermined maximum, said circuit breaker embodying a head piece, circuit terminal contacts carried thereby, a plunger operated by air pressure and movable in said head piece, and a circuit closing bridge piece actuated by said plunger, and adapted to be moved thereby out of contact with said contacts, said piston being formed with a compressed air passage leading to the chamber in which said plunger works so that excess pressure acts first on the piston and then on the plunger, the piston being also formed with a pressure relief passage, the cylinder being formed with a by-pass adapted to bridge and connect the compressed air passage and relief passage of the piston.

6. A pressure regulator for electrically operated air compressors embodying in combination, a compressed air cylinder, a piston working in said cylinder, an electric circuit breaker actuated and controlled by said piston and operating to break the circuit when the air pressure reaches a predetermined maximum, said circuit breaker embodying a head piece, circuit terminal contacts carried thereby, a plunger operated by air pressure and movable in said head piece, a circuit closing bridge piece actuated by said plunger and adapted to be moved thereby out of contact with said contacts, and means for quickly returning said plunger and bridge piece when the normal working pressure is reached.

7. A pressure regulator for electrically operated air compressors embodying in combination, a compressed air cylinder, a piston working in said cylinder, an electric circuit breaker actuated and controlled by said piston and operating to break the circuit when the air pressure reaches a predetermined maximum, said circuit breaker embodying a head piece, circuit terminal contacts carried thereby, a plunger operated by air pressure and movable in said head piece, a circuit closing bridge piece actuated by said plunger and adapted to be moved thereby out of contact with said contacts, and adjustable resistance means acting on said piston in opposition to the air presure on said piston.

In testimony whereof I affix my signature in presence of two witnesses.

JOSEPH A. HERRON.

Witnesses:
H. J. McKenzie,
E. G. Pomeroy.